(12) United States Patent
Rennison et al.

(10) Patent No.: US 10,740,919 B2
(45) Date of Patent: Aug. 11, 2020

(54) SYSTEM AND METHOD FOR DETERMINING A FLUSHNESS OF A FASTENER

(71) Applicant: The Boeing Company, Chicago, IL (US)

(72) Inventors: Ben Rennison, Mount Pleasant, SC (US); Jonathan A. Cox, Daniel Island, SC (US); Jyani S. Vaddi, Karnataka (IN); Christopher A. Greer, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 16/189,756

(22) Filed: Nov. 13, 2018

(65) Prior Publication Data

US 2020/0151893 A1    May 14, 2020

(51) Int. Cl.
*G06T 7/586* (2017.01)
*G06T 15/08* (2011.01)
*G06T 7/593* (2017.01)

(52) U.S. Cl.
CPC .............. *G06T 7/586* (2017.01); *G06T 7/593* (2017.01); *G06T 15/08* (2013.01); *G06T 2200/04* (2013.01)

(58) Field of Classification Search
CPC ......... G06T 15/08; G06T 7/586; G06T 7/593; G06T 2200/04; G01B 5/0025; G01B 5/08
USPC ....................................................... 382/154
See application file for complete search history.

(56) References Cited

U.S. PATENT DOCUMENTS

2014/0285658 A1*  9/2014  Mian .................. G06T 7/001
                                                              348/136

\* cited by examiner

*Primary Examiner* — Daniel G Mariam
(74) *Attorney, Agent, or Firm* — MH2 Technology Law Group LLP

(57) ABSTRACT

A system for measuring a flushness of a fastener in a surface includes a plurality of lights configured to illuminate the fastener and the surface. The system also includes a camera configured to capture a plurality of images of the fastener and the surface while the lights sequentially illuminate the fastener and the surface. The system also includes a computing system configured to determine a normal map of the fastener and the surface based at least partially upon the images, determine a depth map of the fastener and the surface based at least partially upon the normal map, and determine the flushness of the fastener with respect to the surface based at least partially upon the depth map.

20 Claims, 14 Drawing Sheets

SYSTEM AND METHOD FOR DETERMINING A FLUSHNESS OF A FASTENER

FIELD OF THE DISCLOSURE

The present disclosure is directed to systems and methods for measuring a flushness of a fastener. More particularly, the present disclosure is directed to handheld systems and methods for measuring a flushness of a fastener in a surface.

BACKGROUND

Two components are oftentimes held together by one or more fasteners such as screws, bolts, nails, etc. It may be desirable to have the (e.g., head of the) fastener be flush with the (e.g., outer) surface of one of the two components. This may prevent the fastener from inadvertently contacting/snagging an object (e.g., a person) that is moving with respect to the components and the fastener. In addition, when the components and fastener are part of a moving vehicle, such as an aircraft, having the fastener flush may reduce drag, thereby making the vehicle more aerodynamic.

Conventional systems and methods for measuring flushness of a fastener involve a gauge that captures measurements physically/manually. Such gauges have low repeatability, because even a slight pressure in a non-normal direction can alter the measurements. In addition, different gauges may be needed to capture measurements for fasteners of different sizes. Therefore, improved systems and methods for measuring a flushness of a fastener in a surface are needed.

SUMMARY

A system for measuring a flushness of a fastener in a surface is disclosed. The system includes a plurality of lights configured to illuminate the fastener and the surface. The system also includes a camera configured to capture a plurality of images of the fastener and the surface while the lights sequentially illuminate the fastener and the surface. The system also includes a computing system configured to determine a normal map of the fastener and the surface based at least partially upon the images, determine a depth map of the fastener and the surface based at least partially upon the normal map, and determine the flushness of the fastener with respect to the surface based at least partially upon the depth map.

A method for measuring a flushness of a fastener in a surface is also disclosed. The method includes positioning a system with respect to the fastener and the surface. The system includes a camera and a plurality of lights. The method also includes sequentially illuminating the fastener and the surface with the lights. The method also includes capturing a plurality of images of the fastener and the surface while the lights sequentially illuminate the fastener and the surface. The method also includes determining a normal map of the fastener and the surface based at least partially upon the images. The method also includes determining a depth map of the fastener and the surface based at least partially upon the normal map. The method also includes determining the flushness of the fastener with respect to the surface based at least partially upon the depth map.

In another embodiment, the method includes positioning a system with respect to the fastener and the surface. The system includes a camera and a plurality of lights. Positioning the system includes positioning a frame member of the system near, or in contact with, the surface such that a line of sight exists from the camera, through an opening in the frame member, and to the fastener. Positioning the system also includes positioning the system such that a distance between each light and the fastener is substantially constant. Positioning the system also includes orienting the system such that a slant angle between the camera and each light is substantially constant. The method also includes sequentially illuminating the fastener and the surface with the lights. The method also includes capturing a plurality of images of the fastener and the surface, at least one image corresponding to each of the lights illuminating the fastener and the surface. The method also includes determining a normal map of the fastener and the surface based at least partially upon the images. Determining the normal map includes determining a normal vector at one or more pixels in the images based at least partially upon one or more light source vectors and an intensity of the one or more pixels in the images. The method also includes determining a depth map of the fastener and the surface by integrating the normal map. The method also includes applying a high-pass filter to the depth map to remove one or more dome-like features in the depth map to produce a flattened depth map. The method also includes generating a point cloud of the fastener and the surface based at least partially upon the flattened depth map. The method also includes determining the flushness of the fastener with respect to the surface based at least partially upon the point cloud.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1A:
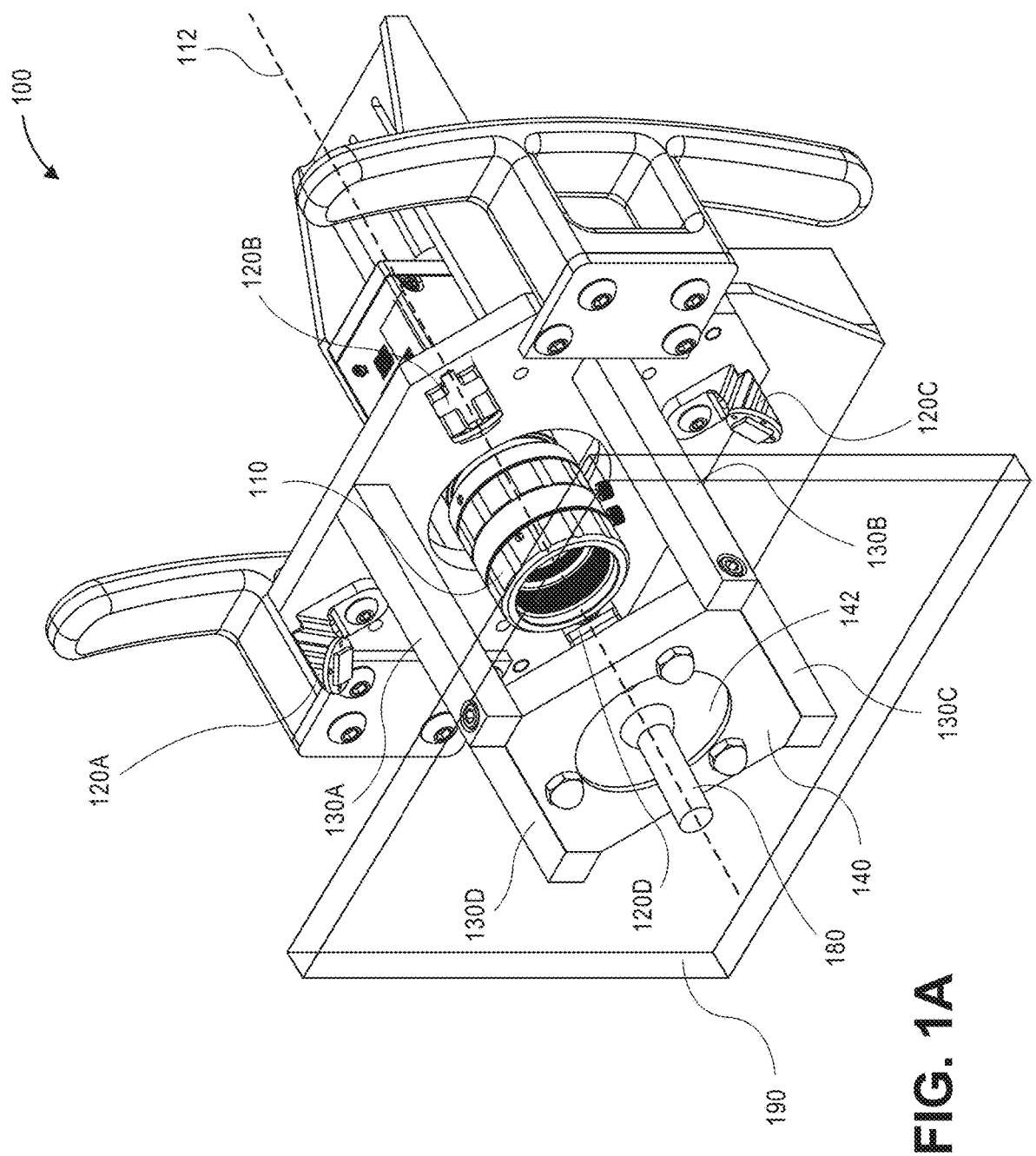
FIGS. 1A and 1B illustrate perspective views of a system for measuring a flushness of a fastener in a surface, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The systems and methods disclosed herein may provide allow a user to measure a flushness of a fastener in a surface more quickly, more accurately, and more precisely. In addition, the system may be handheld for easy movement/use by the user.

Figure 1B:
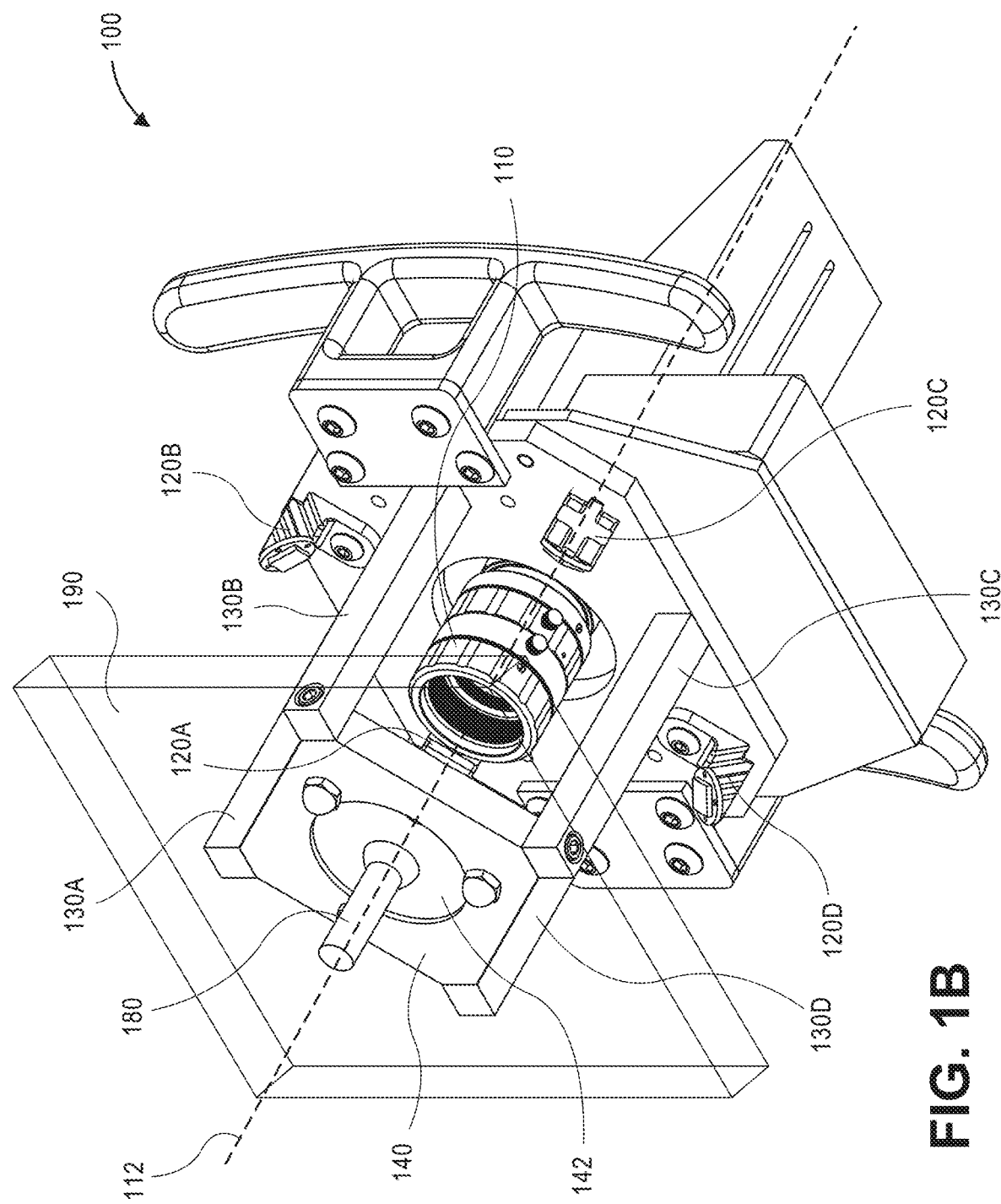
Figure 1C:
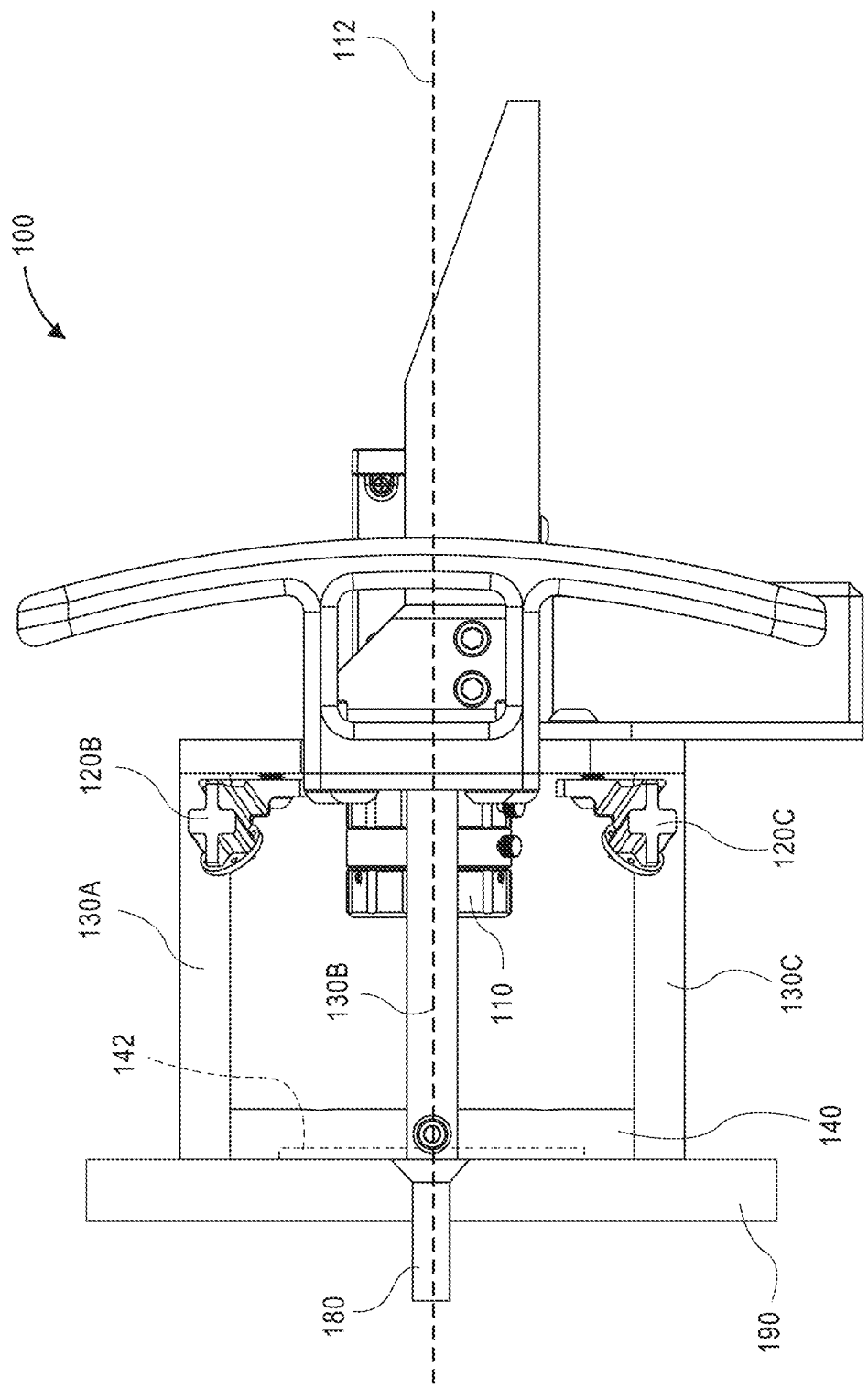
FIG. 1C illustrates a side view of the system, according to an implementation.

FIGS. 1A-1C illustrate views of a system 100 for measuring a flushness of a fastener 180 in a surface 190, according to an implementation. The fastener 180 may be or include a screw, a bold, a nail, etc. that is inserted into a corresponding hole formed in the surface 190. The surface 190 may be or include a component on a vehicle. For example, the surface 190 may be or include an outer surface (i.e., skin) of an aircraft.

The system 100 may include a camera 110 and one or more lights 120A-D. The camera 110 may be stationary/fixed with respect to the object under inspection (e.g., the fastener 180 and/or the surface 190). Although the systems and methods described herein use a single camera 110 and photometric stereo, other systems and methods may also be used to measure the flushness of the fastener 180. Other such systems and methods may include stereo vision, random pattern generation (stereo), structured light scanning (SLS), and shape from shadow (single image surface generation).

The lights 120A-D may be or include light-emitting diodes (LEDs) having substantially identical intensities. The lights 120A-D may be circumferentially-offset from one another (e.g., by equal amounts/angles) with respect to a central longitudinal axis 112 that extends through the camera 110 and/or the fastener 180. For example, when four lights 120A-D are used, the lights 120A-D may be offset from one another by about 90°. Although the implementation described herein includes four lights 120A-D, other implementations may include three or more lights.

The system 100 may also include one or more arms (four are shown 130A-D) that are positioned at least partially between the camera 110 and/or the lights 120A-D on one side and the fastener 180 and/or the surface 190 on the other side. As shown, the arms 130A-D may be circumferentially-offset from one another about the central longitudinal axis 112. A frame member 140 may be coupled to distal (e.g., lower) ends of the arms 130A-D. The frame member 140 may define an opening 142 therethrough, and the camera 110 may be able to view the fastener 180 through the opening 142.

Figure 2:
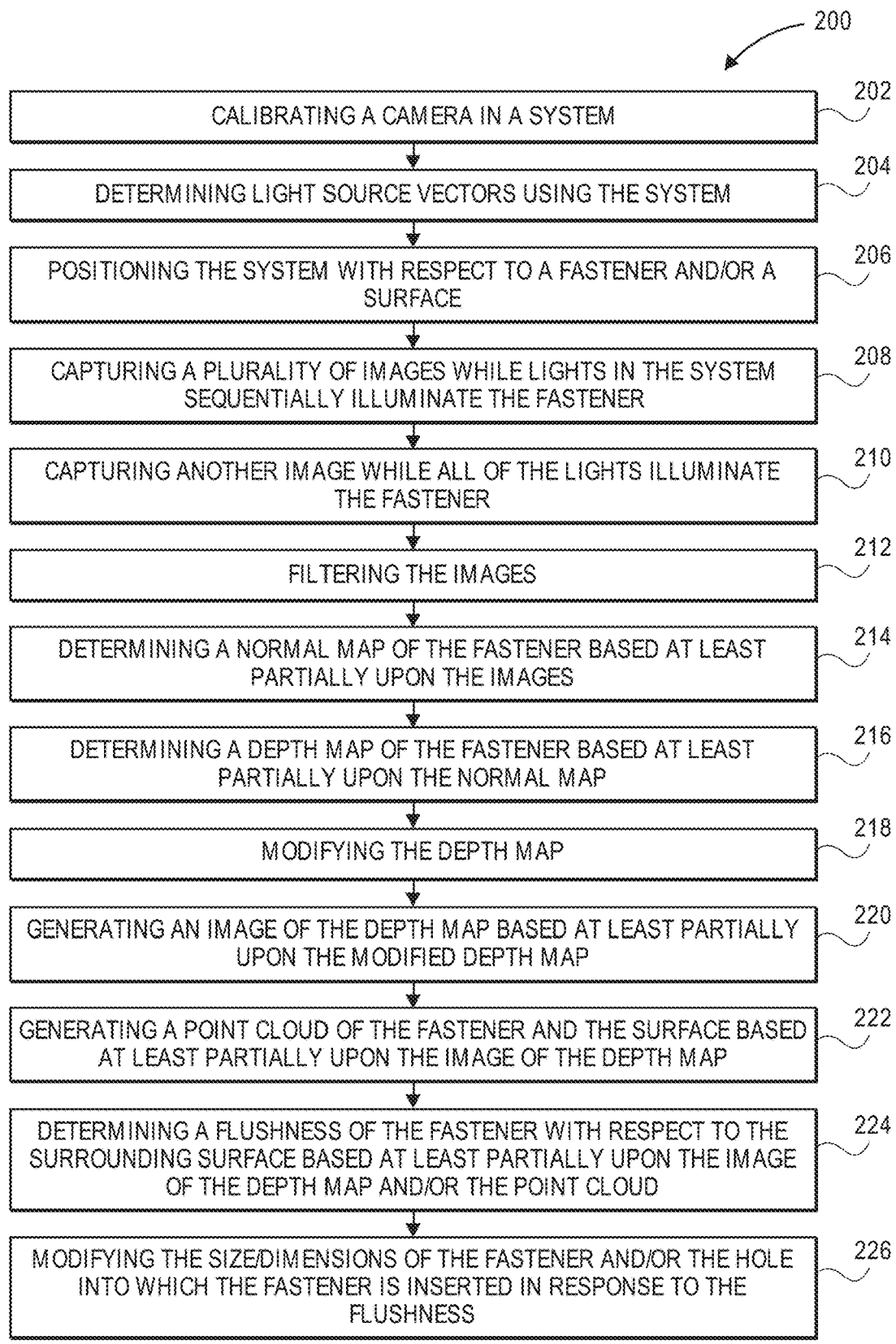
FIG. 2 illustrates a flowchart of a method for measuring the flushness of the fastener in the surface (e.g., using the system from FIG. 1), according to an implementation.
Figure 3:
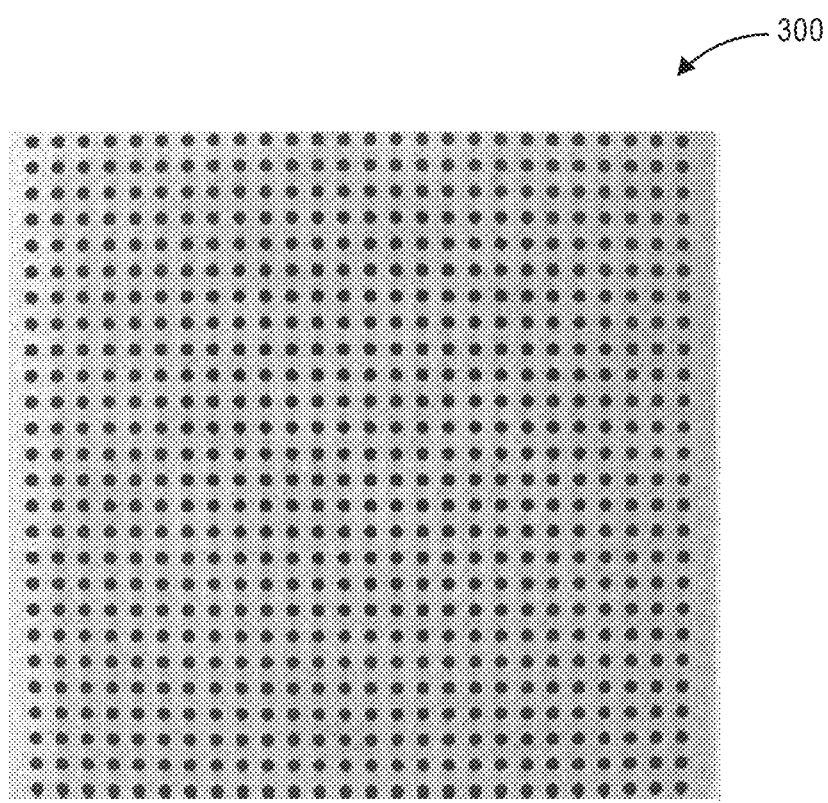
FIG. 3 illustrates a calibration panel to correct lens distortion of a camera in the system, according to an implementation.
Figure 4A:
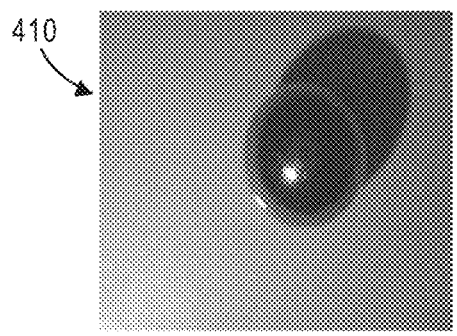
FIGS. 4A-D illustrate images of a chrome sphere captured by the camera, according to an implementation.
Figure 4C:
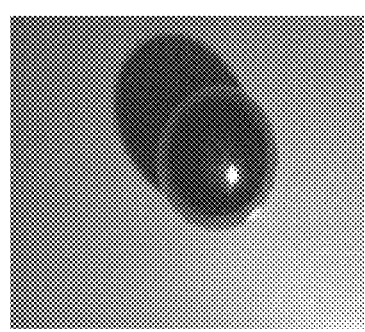
Figure 4B:
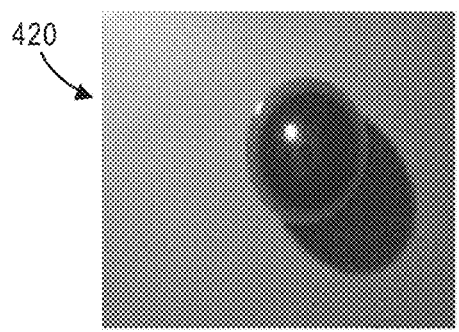
Figure 4D:
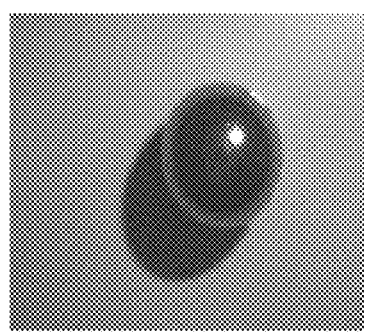

FIG. 2 illustrates a flowchart of a method 200 for measuring the flushness of the fastener 180 in the surface 190 (e.g., using the system 100 from FIG. 1), according to an implementation. In at least one implementation, the method 200 may include calibrating the camera 110, as at 202. The camera 110 may be a pin-hole camera, which may have lens distortion that causes the images captured by the camera to lead to inaccurate measurements. An open CV camera calibration module may be used to correct the distortion. More particularly, the calibration module may include a calibration panel (e.g., a dot pattern board) 300, as shown in FIG. 3, to correct for the distortion. Correcting for the distortion may include calculating the distortion coefficients and camera extrinsic parameters from/using the calibration module, and using these coefficients and parameters to reduce the distortion in the images.

The method 200 may also include determining light source vectors, as at 204. The light source vectors may be determined before or after the camera 110 is calibrated. Determining the light source vectors may include positioning the system (e.g., the camera 110 and/or the lights 120A-D) with respect to a metallic and/or reflective (e.g., chrome) sphere. The sphere may be positioned at the same distance from the camera 110 and/or the lights 120A-D as the fastener 180 will subsequently be positioned. The user may ensure that there is no background lighting or reflecting surfaces (other than the sphere) in the camera's field of view. The user may then sequentially turn on the lights 120A-D, one at a time, and capture an image of the sphere with the camera 110 when the sphere is illuminated by each light 120A-D. This may result in four reflective images 410, 420, 430, 440, as shown in FIGS. 4A-D.

Figure 5:
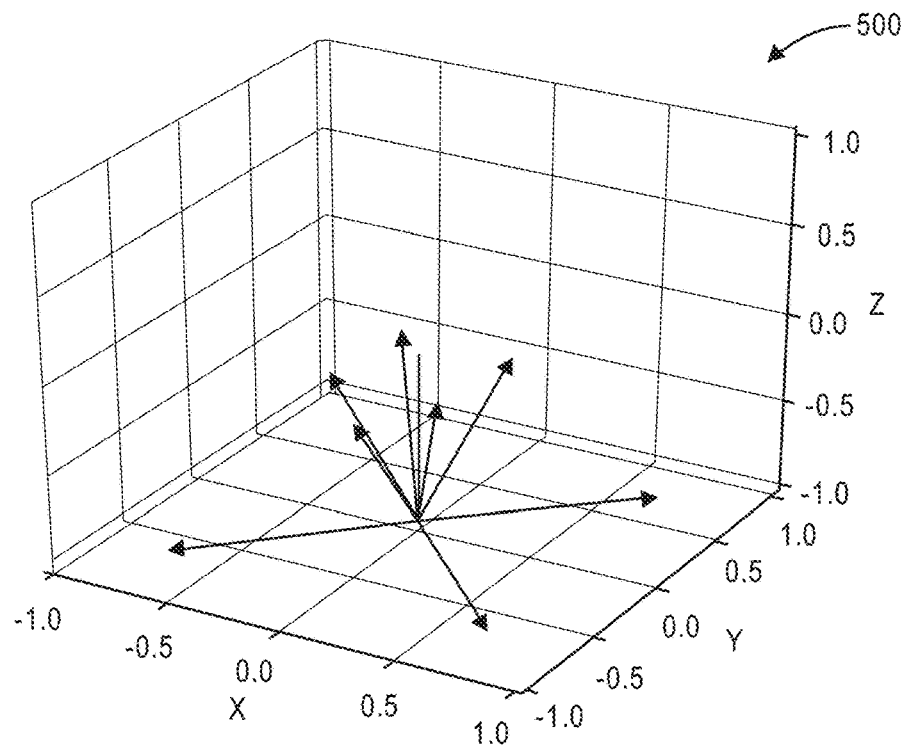
FIG. 5 illustrates a graph showing source vector positions that are calculated using the images from FIGS. 4A-D, according to an implementation.

The light source vectors may then be calculated based at least partially upon the reflective images 410, 420, 430, 440. More particularly, the light source vectors may be calculated using the reflections in the images 410, 420, 430, 440 and the known center of the sphere. FIG. 5 illustrates a graph 500 showing the light source vectors, according to an implementation.

The method 200 may also include positioning the system 100 (e.g., the camera 110 and/or the lights 120A-D) with respect to the fastener 180 and/or the surface 190, as at 206. This may occur after the camera 110 is calibrated and/or the light source vectors are determined.

Positioning the system 100 with respect to the fastener 180 and/or the surface 190 may include placing the frame member 140 near, or in contact with, the surface 190 such that a line of sight exists from the camera 110, through the opening 142 in the frame member 140, to the fastener 180. As used in the preceding sentence, "near" may refer to 10 cm or less, 5 cm or less, or 1 cm or less. The distance between the lights 120A-D and the fastener 180 may be substantially constant to ensure that fastener 180 and the surrounding area of the surface 190 are illuminated sufficiently and uniformly.

As used in the preceding sentence, "substantially constant" may refer to within about 5 mm or less, within about 3 mm or less, or within about 1 mm or less. In at least one implementation, the camera 110, the fastener 180, and the opening 142 may share the central longitudinal axis 112 (i.e., they may all be co-aligned).

Figure 6:
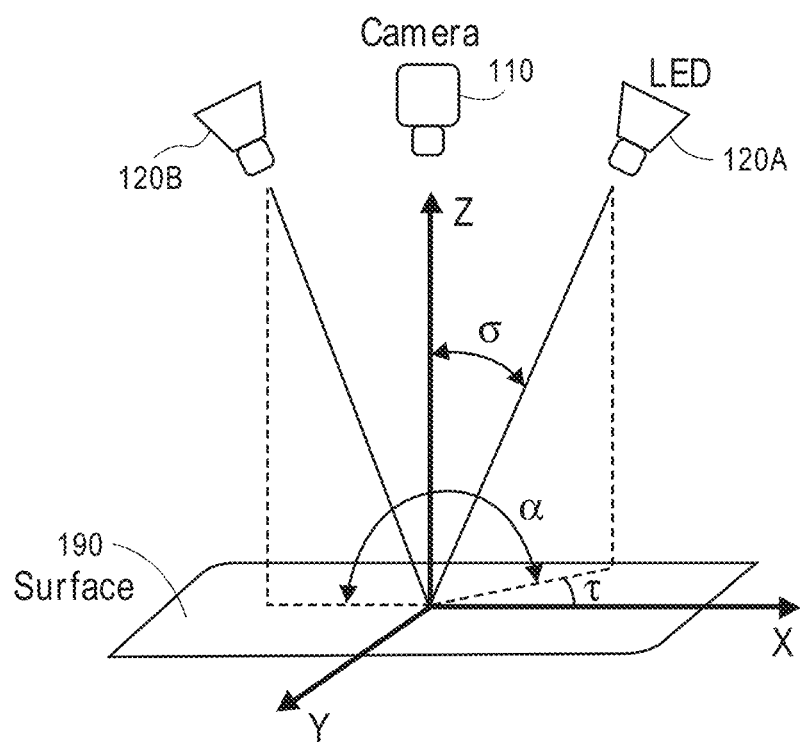
FIG. 6 illustrates a schematic view of the system positioned with respect to the fastener in the surface, according to an implementation.

In addition, positioning the system 100 with respect to the fastener 180 and/or the surface 190 may include orienting the system 100 such that a slant angle σ between the camera 110 and each light 120A-D (with the fastener 180 as the vertex) is substantially constant, as shown in FIG. 6. As used in the preceding sentence, "substantially constant" may refer to about 5° or less, about 3° or less, or about 1° or less. For example, the slant angle σ of each camera 120A-D may be from about 20° to about 70°, about 30° to about 60°, about 40° to about 50°. For example, the slant angle σ may be about 45° for each light 120A-D.

As mentioned above, an offset angle α between each adjacent pair of lights 120A-D (with the central longitudinal axis 112 as the vertex) may be substantially constant, as shown in FIG. 6. For example, the offset angle α may be 90° when the system 100 includes four lights 120A-D.

Figure 7:
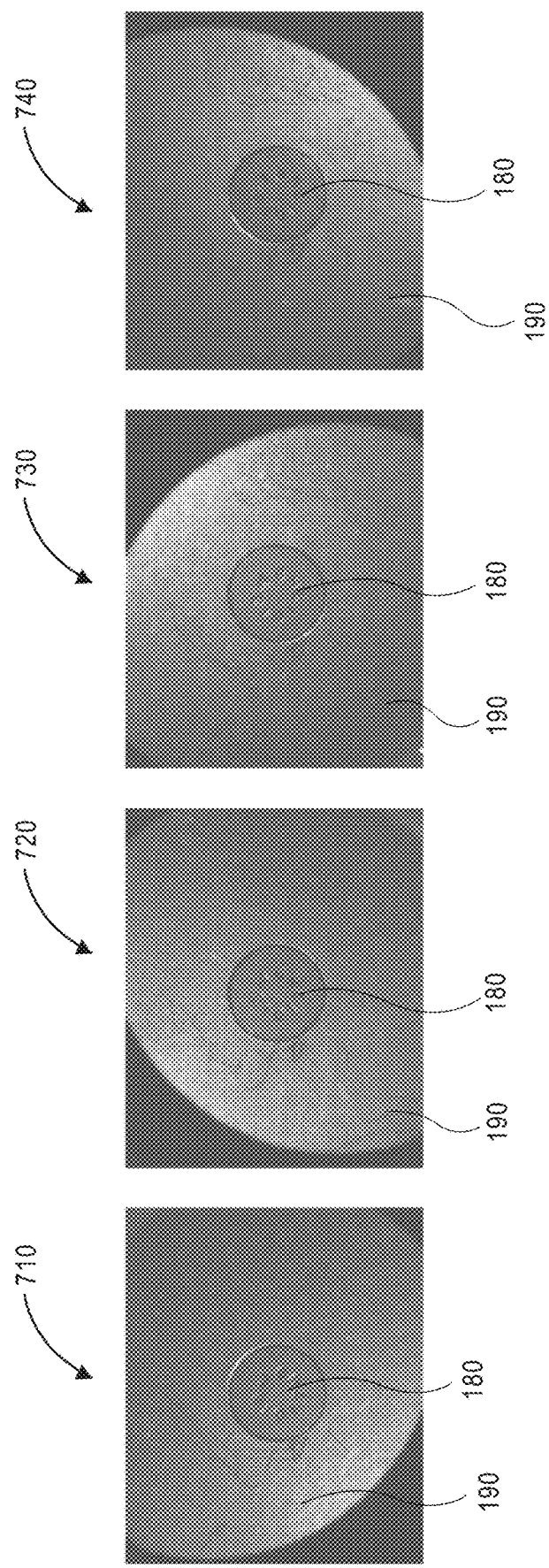
FIG. 7A illustrates an image of the fastener and the component captured by the system of FIG. 1 when a first light in the system is on (and the other lights are off).
FIG. 7B illustrates an image of the fastener and the component captured by the system of FIG. 1 when a second light in the system is on (and the other lights are off).
FIG. 7C illustrates an image of the fastener and the component captured by the system of FIG. 1 when a third light in the system is on (and the other lights are off).
FIG. 7D illustrates an image of the fastener and the component captured by the system of FIG. 1 when a fourth light in the system is on (and the other lights are off).

The method 200 may also include capturing a plurality of (e.g., four) images while the lights 120A-D sequentially illuminate the fastener 180 (and the surrounding area of the surface 190), as at 208. FIG. 7A illustrates an image 710 of the fastener 180 (and the surrounding area of the surface 190) illuminated by the first light 120A. The first light 120A may then be turned off, and the second light 120B may be turned on. FIG. 7B illustrates an image 720 of the fastener 180 (and the surrounding area of the surface 190) illuminated by the second light 120B. The second light 120B may then be turned off, and the third light 120C may be turned on. FIG. 7C illustrates an image 730 of the fastener 180 (and the surrounding area of the surface 190) illuminated by the third light 120C. The third light 120C may then be turned off, and the fourth light 120D may be turned on. FIG. 7D illustrates an image 740 of the fastener 180 (and the surrounding area of the surface 190) illuminated by the fourth light 120D.

Figure 8:
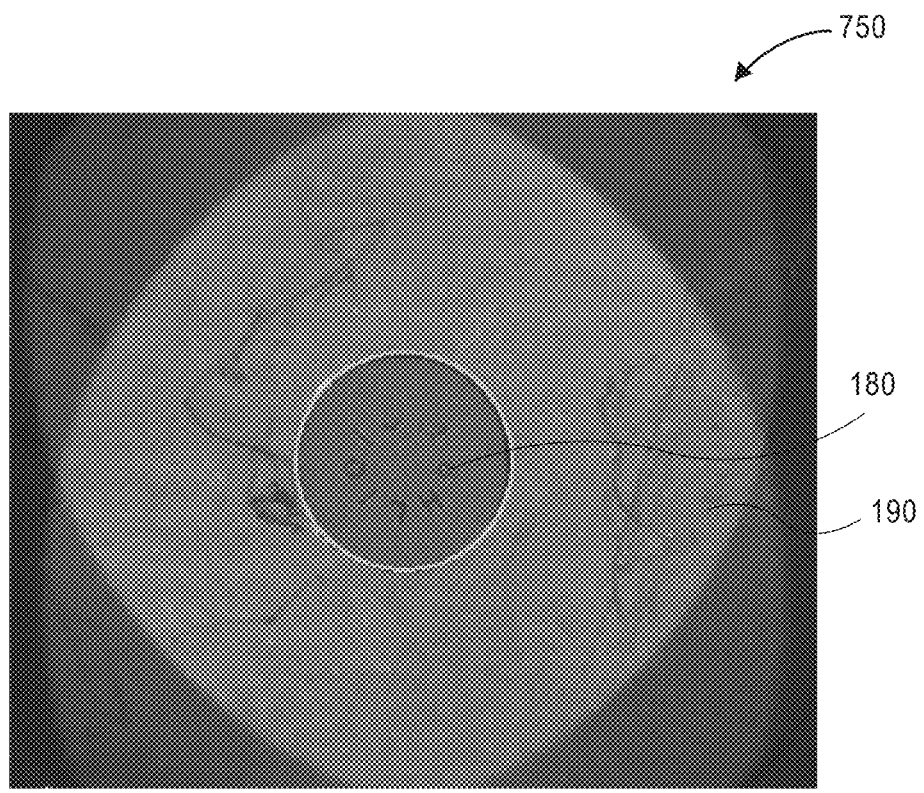
FIG. 8 illustrates an image of the fastener and the component captured by the system of FIG. 1 when all lights in the system are on, according to an implementation.

In at least one implementation, the method 200 may also include capturing a fifth image while all of the lights 120A-D illuminate the fastener 180 (and the surrounding area of the surface 190) simultaneously, as at 210. FIG. 8 illustrates the fifth image 750. The fifth image 750 may be used to determine a diameter of the fastener 180.

In some instances, one or more of the raw images 710, 720, 730, 740, and/or 750 may be marred with noise. Accordingly, the method 200 may also include filtering the images 710, 720, 730, 740, and/or 750, as at 212. More particularly, bilateral filtering may be used to remove the noise in low-frequency areas of the images 710, 720, 730, 740, and/or 750 while retaining sharpness at the edges. The filter may be or include a double Gaussian filter that applies to intensity and distance.

The method 200 may also include calculating/determining a normal map (e.g., including x and y gradients) of the fastener 180 (and the surrounding area of the surface 190) based at least partially upon the images 710, 720, 730, 740, and/or 750, as at 214. In at least one implementation, the normal map may be calculated/determined using the images 710, 720, 730, 740, but not the image 750. The normal map may allow the orientation of the camera 110 and the lights 120A-D to be used for the scan calculation (described below) and the eventual extrusion into a three-dimensional (3D) surface). The normal map may also be used for one or more of the calculations below, as the surface gradient is a prerequisite for the overall calculation of the algorithm (e.g., to calculate a height of the fastener 180).

Surface gradients can be calculated from the normal vectors as defined in Equations 1-3 below:

$$\frac{\partial f}{\partial x} = \frac{N_x}{N_z} \qquad \text{Equation (1)}$$

$$\frac{\partial f}{\partial y} = \frac{N_y}{N_z} \qquad \text{Equation (2)}$$

Here, f represents the depth map of the fastener 180 and/or the surface 190. The variables x, y, and Z represent the Cartesian coordinate axes. The variables $N_x$, $N_y$, and $N_z$ represent the normal vectors along the X, Y, and Z axes, respectively. The terms $$\frac{\partial f}{\partial x} \text{ and } \frac{\partial f}{\partial y}$$

represent the surface gradients along the depth map along the X and Z directions. Equations 1-3 explain how to calculate real world surface gradients of the depth map function f using normal calculated from the 2D images.

$$f(x,y) = \oint_C \left( \frac{\partial f}{\partial x}, \frac{\partial f}{\partial y} \right) \cdot dl + c \qquad \text{(Equation 3)}$$

Equation 3 describes how to calculate a two-dimensional (2D) function in x and y given its partial derivatives along both axes. The symbol $\oint C$ indicates a contour integral, and the $2^{nd}$ term indicates a constant. Direct integration of Equation 3 may be iterative and slow. As a result, the function may be calculated in a closed form instead. This may be done by transforming this as a minimization problem and solving this minimization in the Fourier Domain to obtain a closed form solution.

In at least one implementation, the function f may be solved such that the mean square error in Equation 4 below is minimized.

$$\iint (|\tilde{f}_x - \hat{f}_x|^2 + |\tilde{f}_y - \hat{f}_y|^2) dxdy \qquad \text{(Equation 4)}$$

In this equation, $f$ represents the original depth map that is being evaluated. The variables $\hat{f}_x$ and $\hat{f}_y$ represent the estimated x and y gradients of $f$, respectively, and the variables $\tilde{f}_x$ and $\tilde{f}_y$ represesnt the x and y gradients of the optimized depth function $\tilde{f}$. The variable $\tilde{f}$ approximates the original depth map function $f$.

By transforming this problem into the Fourier domain and solving for $\tilde{f}$, Equation 5 may be obtained.

$$\tilde{F}(\omega) = \frac{-j\omega_x \hat{F}_x(\omega) - j\omega_y \hat{F}_y(\omega)}{\omega_x^2 + \omega_y^2} \qquad \text{(Equation 5)}$$

In Equation 5, $\tilde{F}(\omega)$ denotes the Fourier Transform of the depth map function $\tilde{f}$. The desired depth map $\tilde{f}$ is obtained by calculating the inverse Fourier Transform of $\tilde{F}(\omega)$.

A normal vector at each pixel in the images 710, 720, 730, 740 may be determined based at least partially upon the light vectors (e.g., from step 204) and the intensity of the pixels in the images 710, 720, 730, 740. For example, the normal vectors may be determined using Equation 4 below.

$$I_n(x,y)=L_n \cdot g_n(x,y) \quad \text{(Equation 6)}$$

The pixel intensity of the nth image $I_n$ at pixel x, y is a dot product of the albedo vector g at the same pixel and the light vector L for that image. With at least three measurements at each pixel, and the known light intensities, the normal vector may be calculated by solving a linear system of equations at each pixel, as shown in Equations 5-7 below.

$$\begin{pmatrix} I_1(x,y) \\ I_2(x,y) \\ . \\ . \\ I_n(x,y) \end{pmatrix} = \begin{bmatrix} L_{11} & L_{12} & L_{13} \\ L_{21} & L_{22} & L_{23} \\ . & . & . \\ . & . & . \\ L_{n1} & L_{n2} & L_{n3} \end{bmatrix} \begin{pmatrix} g_x(x,y) \\ g_y(x,y) \\ g_z(x,y) \end{pmatrix} \quad \text{(Equation 7)}$$

$$N_x(x,y) = \frac{g_x(x,y)}{|g(x,y)|}, \quad \text{(Equation 8)}$$

$$N_y(x,y) = \frac{g_y(x,y)}{|g(x,y)|},$$

$$N_z(x,y) = \frac{g_z(x,y)}{|g(x,y)|}$$

$$|g(x,y)| = \sqrt{g_x(x,y)^2 + g_y(x,y)^2 + g_z(x,y)^2} \quad \text{(Equation 9)}$$

In these equations, $N_x$, $N_y$, and $N_z$ represent the normal vectors along the X, Y, and Z axes, respectively. The term $|g(x,y)|$ indicates the magnitude of the albedo vector g.

The method 200 may also include calculating/determining a depth map of the fastener 180 (and the surrounding area of the surface 190) based at least partially upon the normal map, as at 216. More particularly, the depth map may be calculated/determined by integrating the normal map. The depth map may be used to determine the flushness of the fastener 180 in the surface 190. The data initially reconstructs as a dome, which is why the flattening may be helpful.

Figure 9B:
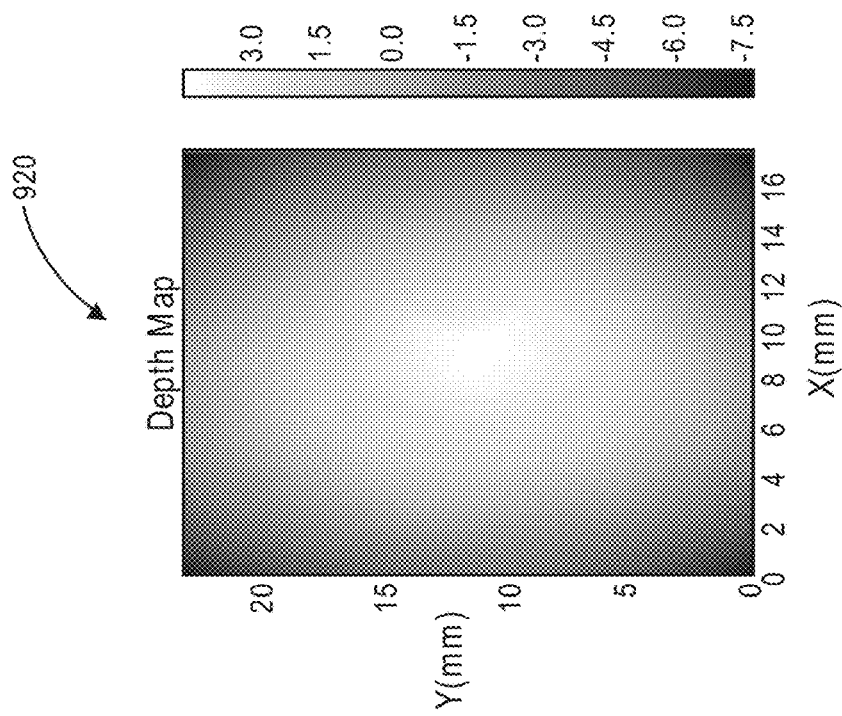
FIG. 9B illustrates a graph of the depth map after it has been flattened (e.g., using filtering), according to an implementation.
Figure 9A:
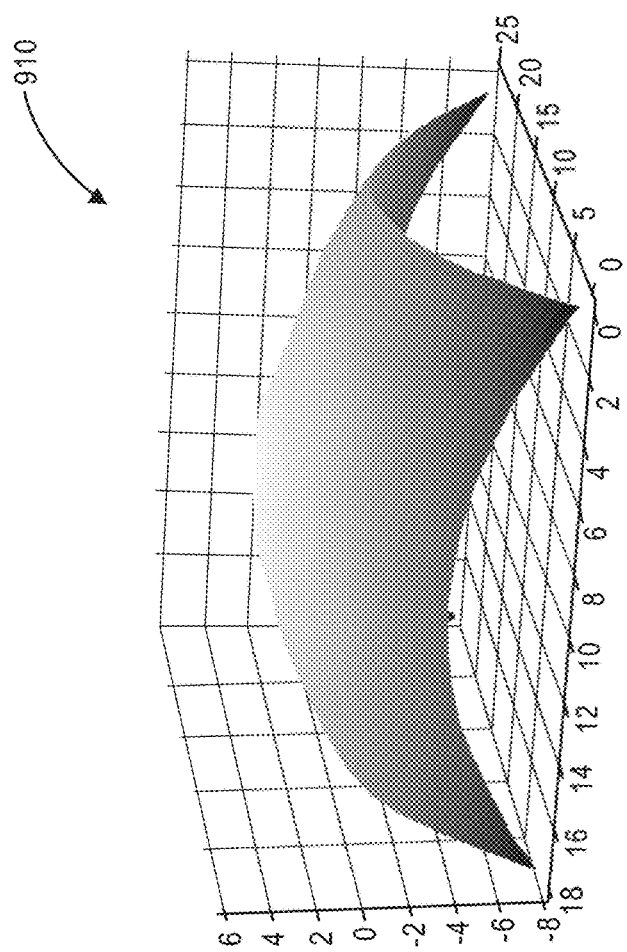
FIG. 9A illustrates a graph of a depth map in a substantially dome shape, according to an implementation.

FIG. 9A illustrates a graph of the depth map 910, according to an implementation. The reconstructed depth map 910 may have a significant low-frequency component (e.g., the dome-shape) in one or two axes because the low frequencies cannot be exactly reconstructed due to the denominator in Equation 5 becoming zero. The denominator $\omega_x^2 + \omega_y^2$ becomes zero when $\omega_x$ (frequency along x axis) and $\omega_y$ (frequency along y axis) is zero. Hence, the user may have to approximate the zero frequency with a small value so as not to make the denominator zero. This is the reason that the zero frequency components resulting in the dome shape seen in FIG. 9A cannot be exactly reconstructed. A high-pass filter may be applied to the depth map 910 to remove the dome-like features to produce a flat depth map 920, as shown in FIG. 9B.

Figure 10:
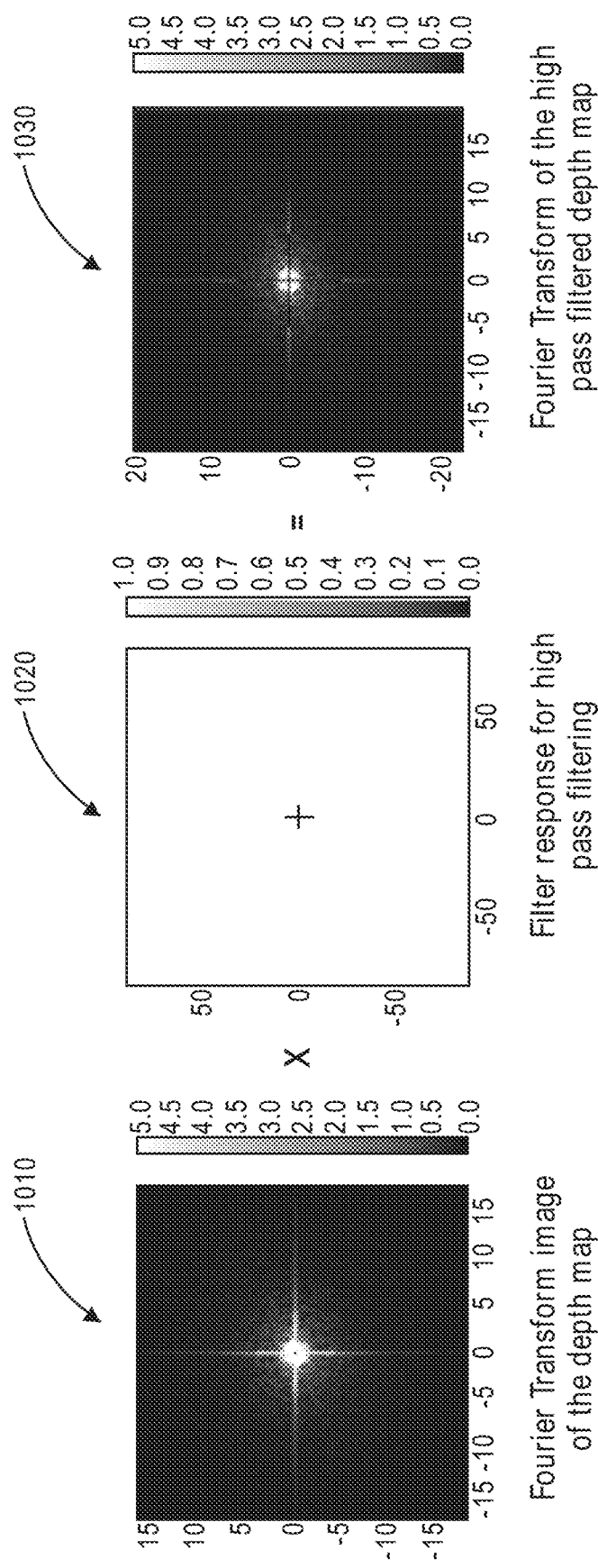
FIG. 10 illustrates a process for generating the depth map (e.g., using filtering), according to an implementation.

The method 200 may also include modifying the (flat) depth map 920, as at 218. This is illustrated in FIG. 10. A Fourier transform of the flat depth map 1010 may be combined with a filter response for high-pass filtering 1020 to produce a Fourier transform of a high-pass filtered depth map 1030. The high-pass filtered depth map 1030 may be more accurate than the flat depth map 920.

Figure 11:
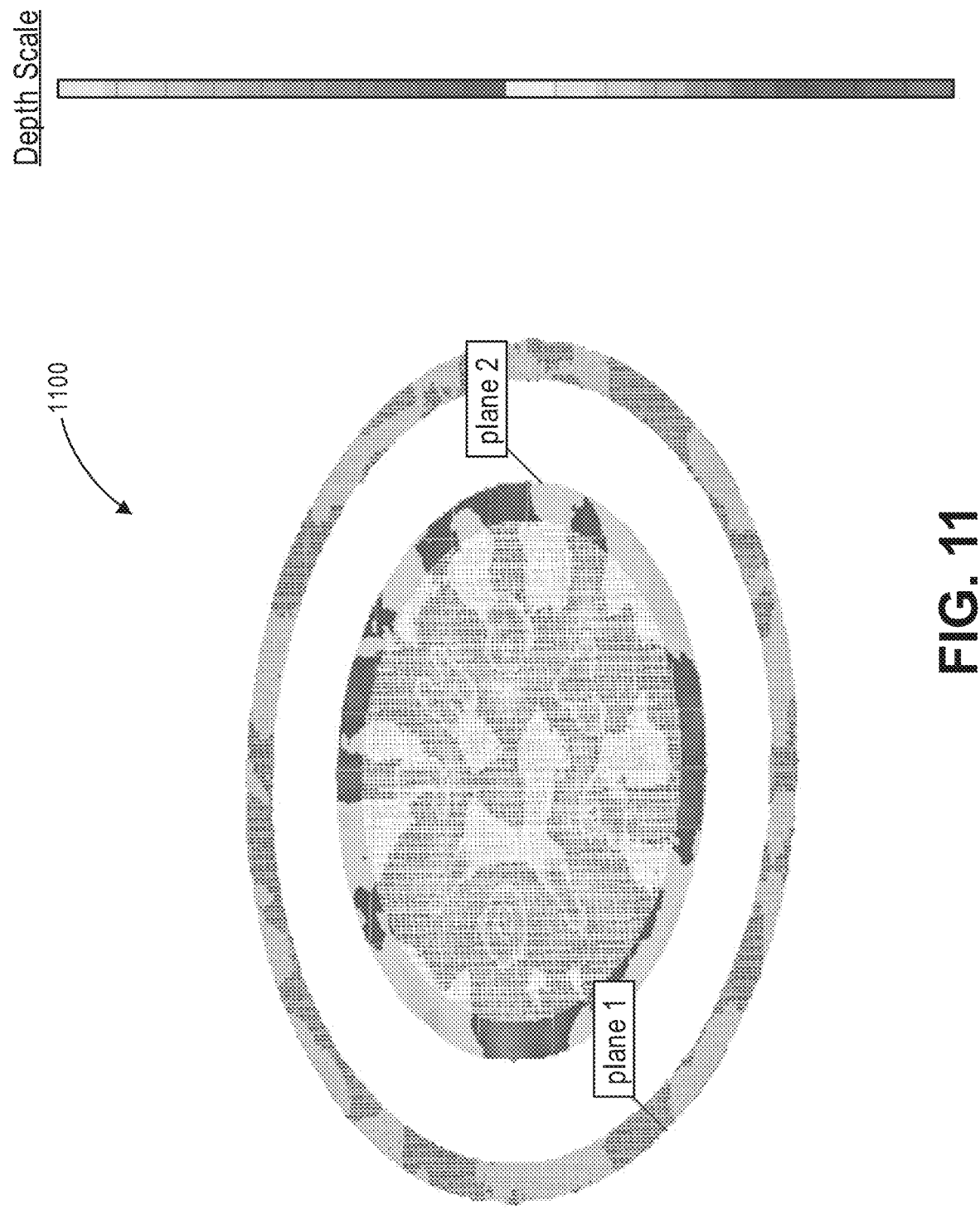
FIG. 11 illustrates a graph of the depth map after the process shown in FIG. 10, according to an implementation.

The method 200 may also include generating an image of the depth map 1100 based at least partially upon the Fourier transform of the high-pass filtered depth map 1030, as at 220. This is shown in FIG. 11. The outer ring is the surface 190 to which the fastener 180 is attaching. The height of the surface 190 minus the height of the fastener 180 may be used to determine the flushness.

The method 200 may also include generating a point cloud of the fastener 180 (and the surrounding area of the surface 190) based at least partially upon the depth map 1100, as at 222. The point cloud may be the earliest form of data returned from the calculation. More particularly, the point cloud is a return of the pixel count from the image board of the camera 110. The cloud to 3D coordinate pixel may be xy, and the point cloud is xyz in a Cartesian coordinate system, which provides the height z. In addition, the point cloud may be used to represent the depth map. Using this technique also allows the user to speed up the image processing rather than creating large matrices and (e.g., triangular) meshes, as is done in conventional systems and methods, and which hinders the speed and overall performance.

Figure 12:
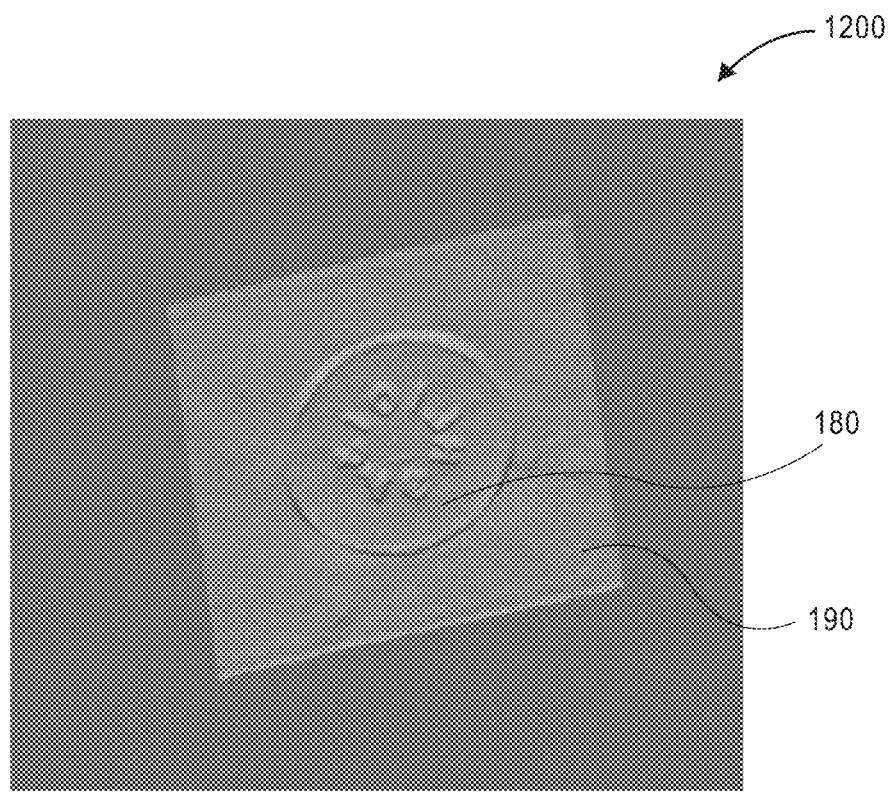
FIG. 12 illustrates an image of a 3D point cloud of the fastener and the surrounding surface generated using the depth map from FIG. 11, according to an implementation.

FIG. 12 illustrates an image of a 3D point cloud 1200 of the fastener 180 and the surrounding surface 190 generated using the depth map 1100 from FIG. 11, according to an implementation. The point cloud 1200 may include an inner fastener region and an outer fastener region.

The method 200 may also include measuring/determining the flushness of the fastener 180 with respect to the surrounding surface 190 based at least partially upon the depth map 1100 and/or the point cloud 1200, as at 224. More particularly, this may include measuring the flushness of the fastener 180 in one or more (e.g., four) regions around the circumference of the fastener 180 (e.g., North, East, South, and West). Each region may be (primarily) illuminated by a different one of the lights 120A-D.

The method 200 may also include modifying the size/dimensions of the fastener 180 and/or the hole into which the fastener 180 is inserted in response to the flushness of the fastener 180 with respect to the surrounding surface 190, as at 226. This modification may be done to the fastener 180 and/or hole upon which the method 200 is performed, and/or to subsequent fasteners 180 and/or holes. The modification may improve the flushness.

The measurement repeatability using the method 200 is +/−0.0005 inches or less. The accuracy of the method 200 is +/−0.0035 inches or less. The processing time (e.g., to perform steps 212-224 of the method 200) is 5 seconds or less per fastener 180.

Figure 13:
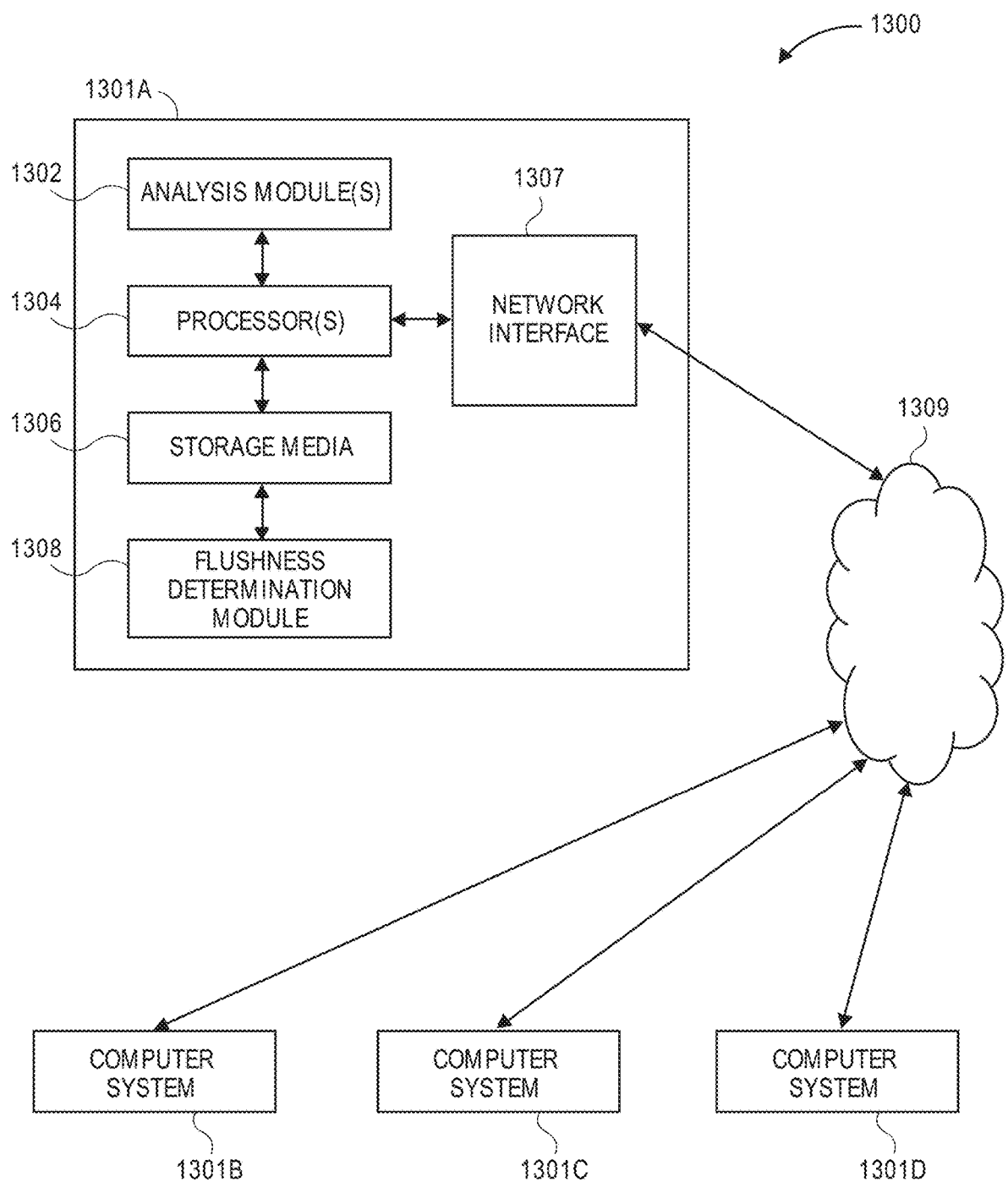
FIG. 13 illustrates a schematic view of a computing system for performing at least a portion of the method(s) disclosed herein, according to an implementation.

In some implementations, the method(s) 200 of the present disclosure may be executed by a computing system. FIG. 13 illustrates an example of such a computing system 1300, in accordance with some implementations. The computing system 1300 may include a computer or computer system 1301A, which may be an individual computer system 1301A or an arrangement of distributed computer systems. The computer system 1301A includes one or more analysis modules 1302 that are configured to perform various tasks according to some implementations, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor may include a microprocessor, microcontroller, processor module or subsystem, programmable integrated circuit, programmable gate array, or another control or computing device.

The storage media 1306 may be implemented as one or more computer-readable or machine-readable storage media. Note that while in the example implementation of FIG. 13 storage media 1306 is depicted as within computer system 1301A, in some implementations, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some implementations, computing system 1300 contains one or more flushness determination module(s) 1308. In the example of computing system 1300, computer system 1301A includes the flushness determination module 1308. In some implementations, a single flushness determination module may be used to perform some aspects of one or more implementations of the methods disclosed herein. In other implementations, a plurality of flushness determination modules may be used to perform some aspects of methods herein.

It should be appreciated that computing system 1300 is merely one example of a computing system, and that computing system 1300 may have more or fewer components than shown, may combine additional components not depicted in the example implementation of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system for measuring a flushness of a fastener in a surface, comprising:
    a plurality of lights configured to illuminate the fastener and the surface;
    a camera configured to capture a plurality of images of the fastener and the surface while the lights sequentially illuminate the fastener and the surface; and
    a computing system configured to:
        determine a normal map of the fastener and the surface based at least partially upon the images;
        determine a depth map of the fastener and the surface based at least partially upon the normal map; and determine the flushness of the fastener with respect to the surface based at least partially upon the depth map.

2. The system of claim 1, wherein the system further comprises a plurality of arm members that are positioned at least partially between the camera and the fastener, and wherein the arm members are circumferentially-offset from one another around a central longitudinal axis through the camera, the fastener, or both.

3. The system of claim 2, wherein the system further comprises a frame member coupled to or integral with the arm members, and wherein the frame member defines an opening through which the camera is configured to view the fastener.

4. The system of claim 1, wherein the lights are circumferentially-offset from one another around a central longitudinal axis through the camera, and wherein a distance between each light and the fastener is substantially constant when the images are captured.

5. The system of claim 1, wherein an offset angle between each adjacent pair of lights is substantially constant, and wherein a slant angle of each light is from about 30° to about 60° when the images are captured.

6. A method for measuring a flushness of a fastener in a surface, comprising:
positioning a system with respect to the fastener and the surface, wherein the system comprises a camera and a plurality of lights;
sequentially illuminating the fastener and the surface with the lights;
capturing a plurality of images of the fastener and the surface while the lights sequentially illuminate the fastener and the surface;
determining a normal map of the fastener and the surface based at least partially upon the images;
determining a depth map of the fastener and the surface based at least partially upon the normal map; and
determining the flushness of the fastener with respect to the surface based at least partially upon the depth map.

7. The method of claim 6, further comprising calibrating the camera using a dot pattern board to reduce lens distortion of the camera, wherein the camera is calibrated before the images are captured.

8. The method of claim 6, wherein positioning the system comprises positioning a frame member of the system near, or in contact with, the surface such that a line of sight exists from the camera, through an opening in the frame member, and to the fastener.

9. The method of claim 8, wherein positioning the system comprises orienting the system such that:
a slant angle between the camera and each light is substantially constant; and
a distance between each light and the fastener is substantially constant.

10. The method of claim 6, further comprising applying a double Gaussian filter to the images, wherein the filter applies to intensity and distance.

11. The method of claim 6, further comprising:
sequentially illuminating a reflective object with the lights;
capturing a plurality of reflective images while the lights sequentially illuminate the reflective object; and
determining a plurality of light source vectors based at least partially upon the reflective images.

12. The method of claim 11, wherein the reflective object comprises a chrome sphere.

13. The method of claim 12, wherein the light source vectors are determined based at least partially upon reflections in the reflective images and a known center of the sphere.

14. The method of claim 11, wherein determining the normal map comprises determining a normal vector at one or more pixels in the images based at least partially upon the light source vectors and an intensity of the one or more pixels in the images.

15. The method of claim 6, wherein determining the normal map comprises determining x and y gradients.

16. The method of claim 6, wherein determining the depth map comprises integrating the normal map.

17. The method of claim 6, wherein the depth map comprises one or more low-frequency features that appear dome-shaped, and further comprising applying a high-pass filter to the depth map to remove the one or more low-frequency features to produce a flattened depth map.

18. The method of claim 6, further comprising generating a point cloud of the fastener and the surface based at least partially upon the depth map, wherein the flushness of the fastener is determined based at least partially upon the point cloud.

19. The method of claim 6, further comprising modifying the fastener, or an opening in the surface through which the fastener is inserted, in response to the flushness of the fastener.

20. A method for measuring a flushness of a fastener in a surface, comprising:
positioning a system with respect to the fastener and the surface, wherein the system comprises a camera and a plurality of lights, and wherein positioning the system comprises:
positioning a frame member of the system near, or in contact with, the surface such that a line of sight exists from the camera, through an opening in the frame member, and to the fastener;
positioning the system such that a distance between each light and the fastener is substantially constant; and
orienting the system such that a slant angle between the camera and each light is substantially constant;
sequentially illuminating the fastener and the surface with the lights;
capturing a plurality of images of the fastener and the surface, at least one image corresponding to each of the lights illuminating the fastener and the surface;
determining a normal map of the fastener and the surface based at least partially upon the images, wherein determining the normal map comprises determining a normal vector at one or more pixels in the images based at least partially upon one or more light source vectors and an intensity of the one or more pixels in the images;
determining a depth map of the fastener and the surface by integrating the normal map;
applying a high-pass filter to the depth map to remove one or more dome-like features in the depth map to produce a flattened depth map;
generating a point cloud of the fastener and the surface based at least partially upon the flattened depth map; and
determining the flushness of the fastener with respect to the surface based at least partially upon the point cloud.

* * * * *